Figures 1, 2, 3:
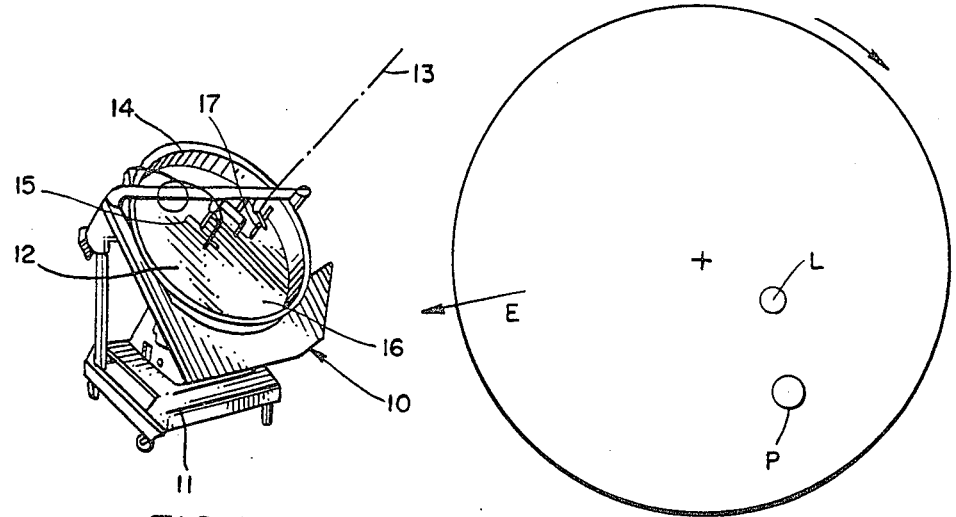

United States Patent [19]

Saldien

[11] 4,323,584

[45] Apr. 6, 1982

[54] METHOD OF PREPARING ANIMAL FEEDS

[75] Inventor: Karel F. Saldien, Fort Wayne, Ind.

[73] Assignee: Central Soya Company, Inc., Fort Wayne, Ind.

[21] Appl. No.: 152,040

[22] Filed: May 21, 1980

Related U.S. Application Data

[63] Continuation-in-part of Ser. No. 90,285, Nov. 1, 1979, abandoned.

[30] Foreign Application Priority Data

Mar. 26, 1980 [NL] Netherlands .......................... 8001790

[51] Int. Cl.³ .............................................. A23K 1/18
[52] U.S. Cl. .................................... 426/285; 426/311; 426/453; 426/623; 426/630; 426/635; 426/657; 426/807
[58] Field of Search .................... 426/311, 2, 454, 285, 426/453, 455, 657, 512, 623, 807, 630, 635

[56] References Cited

U.S. PATENT DOCUMENTS

| | | | |
|---|---|---|---|
| 3,464,824 | 9/1969 | Jensen et al. | 426/285 |
| 3,920,857 | 11/1975 | Barker et al. | 426/285 X |
| 3,966,975 | 6/1976 | Hansen et al. | 426/285 |
| 4,001,451 | 1/1977 | Veeneman et al. | 99/360 |
| 4,156,020 | 5/1979 | Bohrmann et al. | 426/285 |

*Primary Examiner*—R. B. Penland
*Attorney, Agent, or Firm*—Tilton, Fallon, Lungmus & Chestnut

[57] ABSTRACT

A method for preparing animal feeds wherein a multi-element mixture is subjected to disk pelletizing resulting in a unique animal food product.

2 Claims, 3 Drawing Figures

METHOD OF PREPARING ANIMAL FEEDS

This application is a continuation-in-part of parent application Ser. No. 90,285 filed Nov. 1, 1979, now abandoned.

BACKGROUND AND SUMMARY OF INVENTION

This invention relates to a method of preparing animal feeds and, more particularly, to a method employing disk pelletizing. Heretofore, and without exception, to my knowledge, animal feed pellets have been made in pellet mills, usually following some type of conditioning, i.e., cooking—see, for example, co-owned U.S. Pat. No. 4,001,451. The art has been specifically concerned with developing compacted or pressed pellets which have been deemed necessary to avoid the development of fines, dust, etc.

More particularly, the prior art procedures for making animal feed pellets have employed steam as a necessary means for effecting a chemical change of one kind or another in the mash or other starting material and before the same is introduced into the pellet mill. Such chemical reactions are characterized by gelatinization of plasticification which results in a change in the character of the particles.

According to the instant invention, however, I proceed in the directly opposite direction, employing not compaction but, rather agglomeration which results in a more rather than less porous product—as compared to the prior art. Even further, according to the discovered invention, I avoid the need for the chemical reactions normally encountered in the preparation of animal feeds which employ steam. In contrast to the prior art, the instant invention proceeds without change to the particle but merely employs a heretofore unappreciated advantageous build-up by disk pelletizing of one particle on another so as to provide an extremely useful animal feed under ordinary atmospheric conditions, i.e., in the absence of steam.

Disk pelletizing has been employed for many years, particularly in connection with agglomerating ore fines. The procedure involved introducing streams of dry and liquid material into a pan-like member rotating about an inclined axis which results in a "snow-balling" phenomenon wherein the particles agglomerate and thereafter spill over a side portion for collection and further processing.

To the best of my knowledge, this procedure has never been employed for animal feeds although subsequent to my invention, a search of the patent art revealed a mention of disk pelletizing in U.S. Pat. No. 3,464,824 relative to preparing animal feeds and U.S. Pat. No. 3,713,842 having to do with agglomerating ground coffee.

According to the limited disclosure available in the prior art patent '824, steam is essential during the agglomeration step. Further, the prior art '824 patent applies to a very limited group of starting materials to be used as ingredients of animal feeds. By the same token, the prior art '842 patent applies only to a specific material, i.e., coffee and then only when using instant coffee extract as the liquid additive in the disk pelletizer.

Quite surprising, compared with the limited teachings of the prior art, I have found that the invention is particularly effective when making the normal animal feed which has a multiplicity of components, i.e., normally at least 5 different elements or ingredients—of various characters, hardness, etc. In the practice of the invention, a multiple element mixture is introduced into the disk of a disk pelletizer simultaneous with the introduction of a liquid stream.

The resulting pellet, when dried to an equivalent moisture basis is characterized by a substantially reduced bulk density which provides a number of beneficial advantages as will be brought out hereinafter.

In one particularly advantageous facet of the invention, a milk replacer is provided through the agglomeration process. Milk replacer rations have been employed historically for two purposes: (1) for herd replacement, i.e., for raising calves without the presence of the mother cow, and (2) to raise white veal or Continental-style veal. Through the use of the invention, the milk replacer is characterized by an unexpectedly superior instantizing characteristic. Historically, milk replacers were reconstituted by water addition only after a prolonged period of at least 5 minutes accompanied by vigorous agitation. Milk replacer produced according to the instant invention can be reconstituted in less than a minute in the absence of any substantial stirring.

Other objects and advantages of the invention may be seen in the details of the ensuing specification.

The invention is described in conjunction with the accompanying drawing, in which FIG. 1 is a perspective view of a commercial form of disk pelletizer and which can be used advantageously in the practice of the invention;

FIG. 2 is an enlarged fragmentary perspective view of a pilot plant disk pelletizer employed in the practice of the invention as described in greater detail hereinafter; and FIG. 3 is a schematic representation of a disk pelletizer featuring locations of stream impingements in the practice of the invention.

In the illustration given and with reference to FIG. 1, the numeral 10 designates generally a commercially available disk pelletizer which is seen to include a pedestal 11 which rotatably supports a pan-like disk 12 for rotation about a central axis as at 13 and which is inclined to the horizontal.

The disk 12 has an upstanding sidewall as at 14 and the frame of the disk pelletizer provides knives 15 which serve to keep the agglomerated material from compacting near the bottom 16 of the disc. In addition, as illustrated, the pedestal may also support the nozzles or other spouts as at 17 for the delivery of the dry and liquid streams.

As indicated above, disk pelletizers have been used widely in the past and for many years, but for the purpose of agglomerating or reclaiming relatively useless products such as mineral fines and grain fines from dust collectors but not animal feeds. Thus, the principle is applicable here and not any particular make of apparatus—a wide variety of different makes of disk pelletizers can be used advantageously in the practice of the invention.

To further illustrate the invention, a number of specific examples are set forth hereinafter.

EXAMPLE 1

A first embodiment of the invention is to provide a milk replacer for calves. To this end, the following formulation was employed:

| Ingredient | Percent |
|---|---|
| Whey Milk Powder | 55 |
| Skimmed Milk Powder | 20 |
| Animal Fat | 15 |
| Soy Isolate | 10 |
| Vitamins and Trace Minerals | Trace |
| | 100 |

Advantageously, the animal fat is heated to a liquid form and sprayed on the milk powder prior to addition of the other ingredients. The dry mixture then is placed in a hopper above the disk pelletizer and introduced through a spout directed forward the position designated P in FIG. 3. The actual operation of the disk pelletizer is depicted in FIG. 2 but the mixture-delivering spout was rotated out of the way so as to show the details of the agglomeration phenomenon.

Simultaneously with the addition of the dry solids mixture of the above formulation, water was added at the point L in FIG. 3 which is also so indicated in FIG. 2. The moisture content of the dry solids mixture was 4% and sufficient water was added to the disk pelletizer to bring the moisture content of the pellets exiting as at E (see FIG. 3) to 8%. At the time of exiting, the pellets were approximately 3 mm. in diameter, increasing from an average particle size of the dry mixture of about 0.2 mm. During the continuous operation, the one meter diameter disk pelletizer of FIG. 2 was arranged at an angle of 50° relative to the horizontal and the speed of the disk was 27 RPM. The entire agglomeration procedure was carried out at room temperature, approximately 20° C. and at atmospheric pressure, i.e., in the absence of steam considered essential by the prior art. In FIG. 2 the pellets can be seen to be forming on the left side as contrasted to the fine particles exiting on the right side—as evidenced by the different character of the swirl-like patterns.

The pellets exiting from the disk pelletizer were collected in this laboratory operation and subjected to drying while placed in trays in an electrically controlled cabinet wherein the moisture was reduced from 8% to the original 4%.

The mixture prior to water addition had a bulk density of 36 pounds per cubic foot (0.58 kilograms per liter) and the resultant pellets had a bulk density of 22 pounds per cubic foot (0.35 kilograms per liter) yielding a bulk density ratio (after/before) of 0.61.

The pellets resulting from this disk pelletizing having been found extremely advantageous as a milk replacer ration for calves—particularly in that the pellets are reconstitutable much more quickly and effectively than was available in the prior art.

To achieve the reconstitution of the pellets to milk consistency, 5 parts (by volume) of water were employed in connection with one part of the milk replacer. Pellets made according to the above procedure were reconstituted into milk within about 30 seconds. The reconstitution to liquid milk consistency was achieved through utilizing water at 50° C. with very slight stirring to obtain complete homogeneity, the resulting suspension remaining stable for 24 hours. This is in studied contrast to the prior art non-instantized milk replacer products which normally required at least up to 5 minutes with very vigorous stirring in order to achieve reconstitution. Through the practice of the invention, a more porous pellet is achieved which is "instantized" so as to be much more rapidly and easily wettable for the reconstitution.

A variation in the size of the pellets is advantageously achieved through adjustment of the impingement positions of the dry and liquid streams. For example, if the liquid impingement position L is moved radially outward, the resulting pellet size is smaller while, on the other hand, as the impingement position L is moved inwardly, i.e., toward the rotational axis, the pellet size becomes larger. The same change in pellet size attends the movement of the particle impingement target P, i.e., as it is moved radially inwardly, the "balls" become larger while a radially outward movement results in smaller balls. It will be apparent that the size and consistency of the balls can be adjusted by coordinating the location of the impingement targets of the two streams. In particular, if the target P is moved closer to the target L, the balls are made faster, as well.

EXAMPLE 2

To provide a milk replacer product which is reconstitutable with water at tap temperature, i.e., 15°–20° C., as contrasted to the hotter water employed in the example of Example 1 which normally is in the range of 35°–52° C., the procedure of Example 1 was followed but with the substitution of acidified whey milk powder for the whey milk powder, the formulation otherwise being the same as well as the procedure. By following this modified procedure, it is possible to use colder water for the reconstitution.

Also in some instances, it is equally advantageous to utilize crystallized fat as contrasted to spraying the liquid fat onto the milk particles.

EXAMPLE 3

As a further illustration of the scope of the invention, a feed pellet was prepared which is particularly suited for baby pigs. In this case, the following formulation was used as the dry mixture:

| Ingredient | Weight in KG |
|---|---|
| Grain and other carbohydrates | 720 |
| Soybean meal | 160 |
| Fat | 70 |
| Vitamins and Trace Minerals | 15 |
| Milk By-products | 15 |
| Limestone | 10 |
| Dicalcium phosphate | 10 |
| | 1000 |

Here, the grain, i.e., vegetable material was initially ground, i.e., before mixing, to a particle size of about 0.8 mm. After mixing, the average moisture content was about 10%. This was then introduced via the spout P (see FIG. 3) to the disk pelletizer of FIG. 2 along with sufficient water to bring the moisture content in the exiting pellets to 30%. Here the pellet size, i.e., largest transverse dimension, was about 2 mm. The pelletizer was disposed at an angle of 51° and operated at a rotational speed of 26 RPM. The bulk density of the dry mix prior to pelletizing was 41 pounds per cubic foot (0.66 kg/l) and after drying—to bring the pellets to the equivalent moisture content of 10%—the bulk density was 35 pounds per cubic foot (0.56 kg/l), or a bulk density ratio of 0.85.

The pellets resulting from this example are especially advantageous as a dry animal feed in view of the fact that the pellets are somewhat irregular and easily taken up by the animal as contrasted to the pressed, compacted pellets usually provided from a pellet mill.

EXAMPLE 4

To further illustrate the advantageous practice of the invention and with respect to a concentrate useful in connection with an animal feed for ruminants, the following formulation was employed:

| Ingredient | Percentage |
| --- | --- |
| Vegetable Starch | 38 |
| Sodium bicarbonate | 30 |
| Magnesium sulfate | 16 |
| Limestone | 11 |
| Vegetable Filler | 3 |
| Vitamins and Trace Minerals | 2 |
| | 100 |

Here again the vegetable filler was granulated so that the maximum particle size was not substantially greater than 0.8 mm.

The procedure of Example 1 was followed but in this case the angle of the disk was 46° and the speed 28 RPM. Sufficient liquid was introduced at L to bring the moisture content of the exiting pellets to 30%, i.e., 20% above the entering moisture content of 10%. After the pellets were dried so as to return to a moisture content of 10%, the bulk density was 35 pounds per cubic foot (0.56 kg/l) as contrasted to an entering bulk density of 46 pounds per cubic foot (0.74 kg/l). This resulted in a bulk density ratio of 0.76.

The product resulting from this example is useful as an additive to an animal feed in the form of a concentrate, i.e., containing a nutritional ingredient supplement to that provided in a premix yet not containing the full range of ingredients normally encountered in an animal feed. This, as in the case of the premix, promotes flowability and avoids the development of fines or dust which not only impede flowability but also result in waste and inefficiency. Additionally, the pellets of the instant invention avoid the problem of segregation or separation of the various portions of the feed as the same are transported over distances after mixing. The flowability is particularly advantageous in that the particles are free flowing and therefore resist the tendency to cake.

The invention can be practiced with a wide variety of animal feeds and constituents thereof, such as premixes and concentrates and which feeds are applicable to poultry as well as hogs and cattle. In the practice of the invention, I prefer to maintain the angle of the disk in the range of about 40° to about 60° relative to the horizontal and rotate the disk at a speed of from about 10 to about 40 RPM. The liquid stream employed in the practice of the invention, could include, in addition to water, molasses, vinasses (molasses with some sugar removed), lecithin, flavors, and those liquids normally considered compatible with animal feeds. The bulk density ratio can vary over a substantial range, optimally from about 0.60 to about 0.95 although in the case of the milk replacer, a more limited range is more advantageous, i.e., from about 0.60 to about 0.75. As to animal feeds having the complete formulation, the invention provides two basic forms—one where a milk product is the major constituent and the other is where the major constituent is from a vegetable source. For concentrates, the nutritional additive is the largest single ingredient and likewise comes from a vegetable source.

While in the foregoing specification, a detailed description of the invention has been set down for the purpose of illustration, many variations in the details hereingiven may be made by those skilled in the art without departing from the spirit and scope of the invention.

I claim:

1. A method of preparing animal feeds consisting essentially of providing a multiple ingredient mixture having a particle size less than about 0.80 mm. and continuously introducing a dry stream of said mixture having a predetermined moisture content into a disk pelletizer inclined at an angle from about 40° to about 60° relative to the horizontal and rotating said pelletizer at a speed effective to produce agglomerated balls while simultaneously introducing separately a stream of water into said disk pelletizer with both streams being at room temperature and atmospheric pressure, and continuously removing balls and drying said balls to provide a product having a bulk density ratio of ball to said ingredient mixture of from about 0.60 to about 0.95 on the same moisture content basis, said mixture including milk particles present at least in an amount of about 30% of said mixture and having a particle size less than about 0.2 mm., and the ball diameter being about 3 mm. whereby a milk replacer is achieved which is reconstitutable with water to milk consistency in about one minute without substantial agitation.

2. The method of claim 1 in which said mixture includes acidified whey milk powder to afford reconstitutability with water in the temperature range of about 15° to about 20° C. in less than about one minute.

* * * * *